United States Patent [19]

Gotou et al.

[11] Patent Number: 4,679,140
[45] Date of Patent: Jul. 7, 1987

[54] DATA PROCESSOR WITH CONTROL OF THE SIGNIFICANT BIT LENGTHS OF GENERAL PURPOSE REGISTERS

[75] Inventors: Shizuo Gotou, Hachiouji; Toyohiko Kagimasa, Kokubunji; Seiichi Yoshizumi, Hino, all of Japan; Yooichi Shintani, Pittsburgh, Pa.

[73] Assignee: Hitachi, Ltd., Tokyo, Japan

[21] Appl. No.: 684,785

[22] Filed: Dec. 21, 1984

[30] Foreign Application Priority Data

Dec. 23, 1983 [JP] Japan .............................. 58-242018
Oct. 3, 1984 [JP] Japan .............................. 59-206235

[51] Int. Cl.$^4$ ............................................ G06F 12/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,077,058 | 2/1978 | Appell et al. | 364/200 |
| 4,361,868 | 11/1982 | Kaplinsky | 364/200 |
| 4,500,962 | 2/1985 | Lemaire et al. | 364/200 |

*Primary Examiner*—Thomas M. Heckler
*Attorney, Agent, or Firm*—Antonelli, Terry & Wands

[57] ABSTRACT

A mode register stores a mode bit for each of the general registers, an access circuit accesses the general registers and the mode register so that a general register designated by an instruction and a corresponding mode bit are read out together. A data use circuit or a data supply circuit connected to the general registers includes a circuit portion which effectively changes the significant bit length of the data read out of the designated general register or of the data to be written into the designated general register.

13 Claims, 6 Drawing Figures

DATA PROCESSOR WITH CONTROL OF THE SIGNIFICANT BIT LENGTHS OF GENERAL PURPOSE REGISTERS

BACKGROUND OF THE INVENTION

The present invention relates to a data processor which includes general purpose registers as one of the fundamental elements thereof.

Recently, there have been high demands for an increase of the storage area accessible by a program, that is, by address extension, and an increase of the data length which can be handled by an arithmetic unit, that is, by data extension. A new machine which can satisfy these demands also must satisfy the condition that the new machine can run a lot of already existing old programs which are not adapted to the new extended address range or the new enlarged data length.

One prior art system which has accomplished address extension is explained in "IBM System/370 Extended Architecture Principles of Operations" (SA-22-7085-0) published by Internatinal Business Machines Corp. According to this prior method, an address extension bit field is provided within a program status word (PSW) which controls execution of a program. If the address extension bit is "0", the address maximum value is treated as $2^{24}-1$, while the address maximu value is treated as $2^{31}-1$, when the address extension bit is 1. Thus, the address limit is enhanced from 24 bits to 31 bits in this way. A more detailed explantion of this technique will be given hereinafter.

Figure 1:
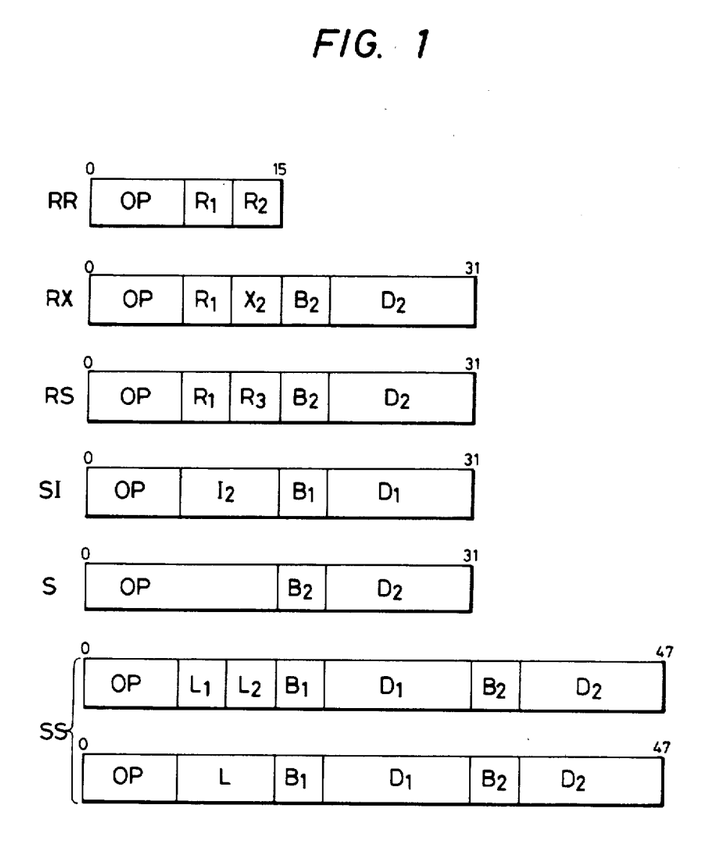
FIG. 1 shows formats of various instructions used in the conventional data processor.

According to FIG. 1, the fields $R_1$, $R_2$, $R_3$, $B_1$, $B_2$ and $X_2$ each represent a register number field of four bits which designates one of sixteen general purpose registers. The usage of the content of a designated general purpose register is determined according to each instruction format. For example, the fields $B_1$ and $B_2$ each designate a base register. The contents of the general purpose registers designated by $B_1$ and $B_2$, respectively, are added to the contents of displacement fields $D_1$ and $D_2$, to generate memory access addresses. The field $X_2$ designates an index register. The content of a general purpose register designated by the index field $X_2$ is added to the sum of the content of the base register $B_2$ and the displacement $D_2$, to generate a memory access address. The contents of registers designated by the $R_1$ to $R_3$ fields are used as address data on operand data, depending upon each instruction.

The length of the general purpose registers is 32 bits. According to the prior art mentioned above, the most significant one or eight bits of the content of a general purpose register designated by an instruction may be neglected, depending upon whether the address extension bit is 0 or 1. The storing of the address data into the general purpose registers is performed by a load instruction which loads 32 bits of data into a general purpose register or by an Add instruction which performs an addition of 32 bit data in the main storage and 32 bit data in a general purpose register to store the sum of 32 bits into a general purpose register. Therefore, according to this prior art system, loading of address data is performed by an instruction which deals with 32 bit data, but reading out of address data from a general purpose register is performed in such a manner as to neglect the most significant one or eight bits of the readout data, so as to generate 31 bit address data or 24 bit address data, depending upon the value of the address extension bit in the PSW.

According to our recent research, however, the need for a larger storage area accessible with addresses larger than 31 bits may be desirable in the near future; however, according to the prior art, such large addresses cannot be utilized, because of the limited bit length of the general purpose registers. One approach we considered is to extend the length of the general purpose registers to a larger value, e.g., to 64 bits. However, the conventional arithmetic operation unit in the prior art system is capable of processing the standard data length, e.g., 32 bits, and so, it is impossible to enable the arithmetic operation unit to generate 64 bits of address data in response to conventional instructions. In other words, new types of instructions are required in order to generate 64 bit address data using the conventional 32 bit arithmetic operation unit. In order to avoid usage of such new instructions, it is desirable to have an arithmetic operation unit which can handle a 64 bit arithmetic operation. Furthermore, if it is desirable to handle the conventional programs which expect to use a 32 bit arithmetic operation unit, a data processor should have both 64 bit and 32 bit arithmetic operation units. This makes it possible to selectively use the 64 bit arithmetic operation unit for newly developed programs by setting the address extension bit in the PSW to 1, and to use the 32 bit arithmetic operation unit for the conventional program by setting the address extension bit in the PSW to 0. The problem with this proposed modification of the prior art is that it is difficult to execute a program which wants to make use of the extended addresses as well as the 32 bit arithmetic operation unit.

The future need for a greater data length than the conventional 32 bits is also inevitable. However, even if we adopt 64 bit general purpose registers in the data processing system, we must make sure that the 32 bit arithmetic operation is also possible for a conventional program.

As is clear from the foregoing explanation, it is desirable for a data processor to be able to perform any of the arithmetic operations of the extended bit length (e.g., 64 bit) and the conventional bit length (e.g., 32 bit), as well as to use addresses of extended address length (e.g., 64 bits) and conventional address length (e.g., 32 bits).

SUMMARY OF THE INVENTION

Therefore, it is a purpose of the present invention to provide a data processor which can handle both address data of a smaller signifiant bit length used in a conventional program and address data of a larger significant bit length, as well as both operand data of a smaller significant bit length used in a conventional program and operand data of a larger significant bit length.

In order to attain this purpose of the invention, a mode register stores a mode bit for each of the general registers, an access circuit accesses the general registers and the mode register so that a general register designated by an instruction and a corresponding mode bit are read out together. A data use circuit or a data supply circuit connected to the general registers includes a circuit portion which effectively changes the significant bit length of the data read out of the designated general register or of the data to be written into the designated general register.

DETAILED DESCRIPTION OF A PREFERRED EMBODIMENT (System Configuration)

Figure 2:
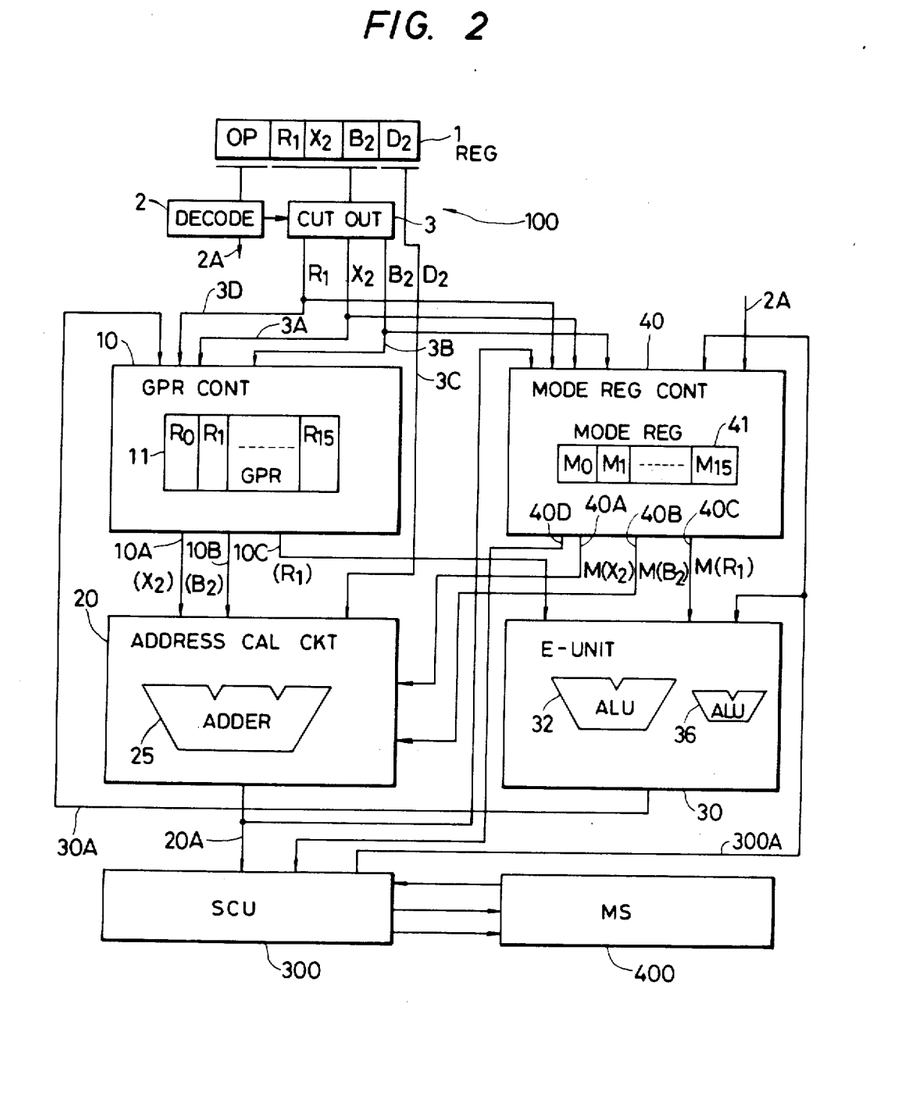
FIG. 2 is a schematic diagram of a data processor according to the present invention.

Referring to FIG. 2, a data processor includes the following parts:

(1) Instruction decode part (100).

This part includes an instruction register 1, and a decoder 2 which decodes an operation code part of an instruction stored in the instruction register to control a cut out circuit 3 as well as other parts of the data processor. The reference number 2A represents a signal line on which control signals are transferred to other parts of the processor. The cut out circuit 3 cuts out various parts of the instruction stored in the instruction register 1, in response to the decoded result of the decoder 2.

(2) General register control part (10).

This part includes 16 general registers 11 each having a bit length of 64 bits, as well as a control for controlling the read or write operations to the general registers 11.

(3) Address calculation part (20).

This part calculates an access address MA for access to the main storage 400 by use of an adder 25 based upon the data provided from the general register control part 10. This part is responsive to mode bits provided by a mode register 41, so that different significant bit lengths for address data are obtained.

(4) Execution unit (30).

This unit performs an arithmetic or logical operation on data read out from the general registers or from the main storage 400. This part includes two ALU's 32 and 36, so that different data of different significant bit lengths are produced in response to mode bits given by the mode register 41.

(5) Mode register control part 40.

This part includes the mode register 41 and a control therefor. The mode register 41 holds a plurality of mode bits each corresponding to a respective one of the general purpose registers. A mode bit of a value 1 indicates that the signficant bit length of a corresponding general purpose register should be treated as 64 bits, while a mode bit 0 indicates that the significant bit length should be treated as 32 bits. The initial values of all mode bits are desired to be 0.

(6) Storage Control Unit 300.

This unit accesses the main storage 400 to fetch data therefrom or to store data therein in response to the memory address MA generated by the address calculation part 20.

(Explantion of the operation)

For example, suppose that a load or add instruction is held by the instruction register 1, and the mode register 41 has mode bits of 0 and 1 for a general register designated by field $X_2$ and a general register designated by field $B_2$, respectively. The mode bit for the general purpose register designated by the field $R_1$ may be 0 or 1. The operation for this instruction is as follows.

(1) Instruction decode stage.

When the Load or Add instruction is decoded, the cut out circuit 3 sends the $X_2$, $B_2$ and $R_1$ fields of the instruction onto lines 3A, 3B and 3D, respectively, to provide these three register number fields to the general register control 10 as well as to the mode register control 40. The displacement field $D_2$ of the instruction stored in instruction register 1 is applied to the address calculating circuit 20 by way of a line 3C.

The general register control 10 reads out the data contents of the registers identified by the fields $X_2$, $B_2$ and $R_1$, these data contents being hereinafter referred to by $(X_2)$, $(B_2)$ and $(R_1)$, respectively, onto lines 10A, 10B and 10C, respectively. The data $(X_2)$ and $(B_2)$ is transferred to the address calculation circuit 20, in any one of the various Load instructions and Add instructions but the data $(R_1)$ is tranferred to the E unit 30 as an operand in the case of an ADD instruction.

The mode register control 40 reads out mode bits for the general register identified by the fields $X_2$, $B_2$ and $R_1$, and these mode bits will be referred to hereinafter by $M(X_2)$, $M(B_2)$ and $M(R_1)$, respectively. The mode bits $M(X_2)$ and $M(B_2)$ are tranferred to the address calculating circuit 20 by way of lines 40A and 40B, but the mode bit $M(R_1)$ is transferred to the execution unit 30 by way of a line 40C.

(2) Address calculation.

The contents $(X_2)$ and $(B_2)$ of two general registers are added to the displacement field $D_2$ by the adder 25. In this calculation, the mode bits $M(X_2)$ and $M(B_2)$ control the significant bit length of the register contents $(X_2)$ and $(B_2)$. As seen from FIG. 3, it is presumed for this example that the mode bits $M(X_2)=0$ and $M(B_2)=1$. In this case, the upper 32 bits of the register contents $(X_2)$ is replaced by 32 bits of bit value 0, as seen from FIG. 3, thereby reducing the significant bit length of the register content $(X_2)$ to 32 bits. After modification of the register content $(X_2)$, the addition is performed to generate a 64 bit address, as shown by reference number 6 in FIG. 3. Thus, it is possible to access an extended memory region of an address region of $2^{32}$ to $2^{64}$.

Figure 3:
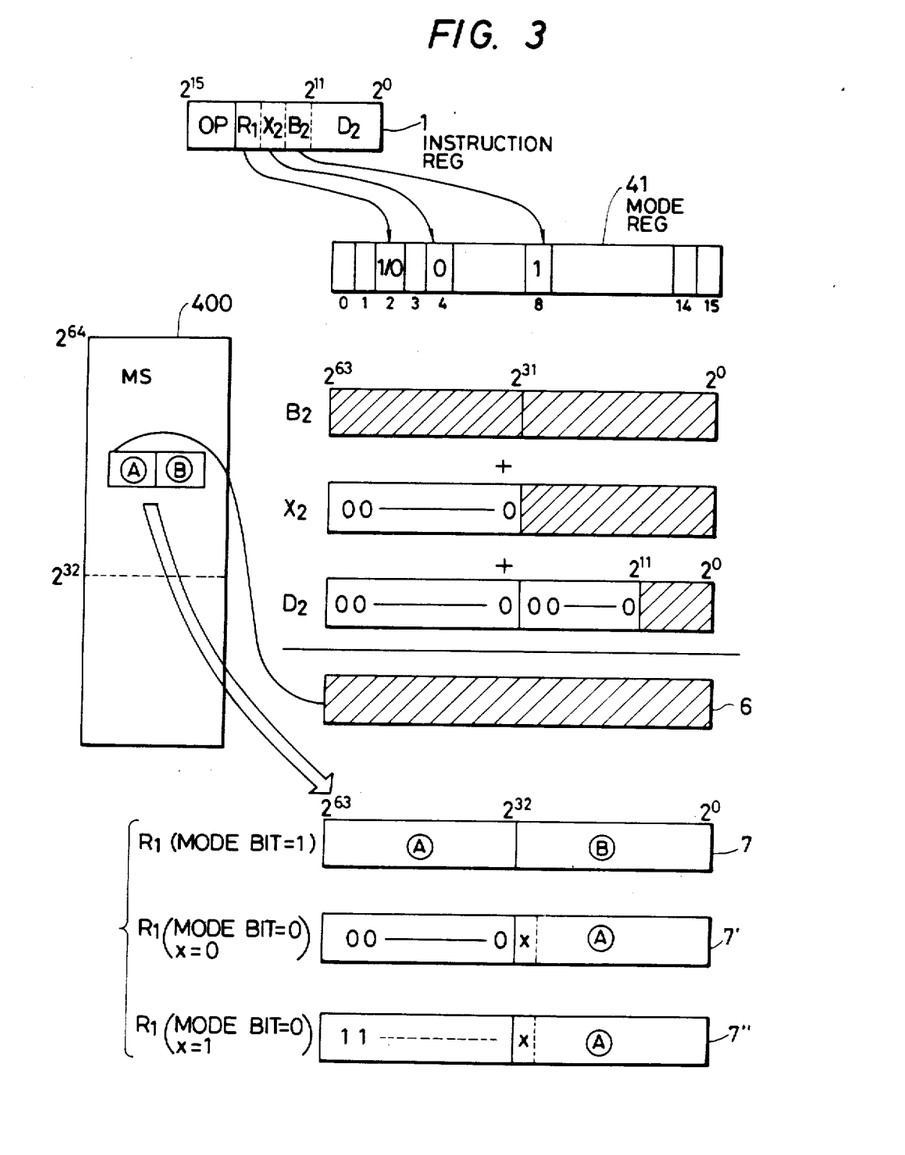
FIG. 3 is a diagram which explains the fundamental operation of the data processor of FIG. 2.

(3) Operand load stage.

The main storage 400 is accessed by means of the storage control unit 300 based upon the generated address 6 to fetch an operand of 64 bit length (A and B parts in FIG. 3) therefrom. When the generated address 6 is a virtual or logical address, it is transformed to a physical address within the storage control unit 300, as is conventional in the art. Thus, data stored in a memory region at addresses up to $2^{64}$ bits can be fetched.

(4) Execution stage.

In case of a Load instruction, the fetched data is sent to GPR cont 10 by way of line 30A from E unit 30, to write the fetched data into a general purpose register designated by the field $R_1$ without the ALU's 32 and 36 being used. The significant bit length of the fetched data is controlled by the E unit 30 before it is written into the general register $R_1$. As shown by a reference number 7 in FIG. 3, the fetched data of 64 bit length is not modified, if the mode bit $M(R_1)$ for the register $R_1$ is 1, but the fetched data is modified when the mode bit $M(R_1)$ is 0. That is, the most significant 32 bit (part A) of the fetched data is used as the least significant 32 bits of the data to be written. In particular, if the sign bit, i.e., the most significant bit n of the fetched data is 0, 32 bits of bit value 0 are attached at the more significant bit side of the most significant bit (part A) of the fetched data as shown by the reference number 7' in FIG. 3. If the sign bit n is 1, 32 bits of bit value 1 are attached quite the same way, as shown by the reference number 7" in FIG. 3. The fetched data thus modified is transferred to the general register control 10 on line 30A to be written in register $R_1$. Thus, data having a significant bit length of either 64 bits or 32 bits is written into the register $R_1$, depending upon the state of the mode bit $M(R_1)$.

In case of an Add instruction, it is necesary to add the register content $(R_1)$ already provided by the designated general purpose register to the fetched data. The addition is performed by two adders 32 and 36, respectively, having a 64 bit width and 32 bit width. The adder 36 performs addition of the most significant 32 bits (part A) of each of the fetched data and the register contents, and the result of the addition by the adder 36 is modified so that 32 bits of bit value 0 or 32 bits of bit value 1 are added to the more significant bit side of the 32 bit result of the adder 36, depending upon whether or not the sign bit, i.e., the most significant bit of the result by the ALU 36 is 0 or 1. Either one of the 64 bit result of addition by an adder 32 or the 32 bit result of addition by an adder 36 with further attached 32 bits is selectively transferred to the general register control 10, to be written into the register $R_1$, depending upon whether the mode bit $M(R_1)$ is 1 or 0, thus enabling reduction of the significant bit length of the data to be written into the general register $R_1$, when $M(R_1)$ is 0.

Hereinafter, details of the various parts of the data processor of FIG. 2 will be explained in more detail.

General purpose register control (10).

As is clear from the foregoing explanation, the general registers designated by fields $X_2$, $B_2$ and $R_1$ are accessed in parallel for read out in parallel.

A parallel read out of plural general purpose registers is already known. Furthermore, the register designated by field $R_1$ is used first for read out of the contents $(R_1)$ thereof and then for write in of the fetched data therein. This is also attained in the prior art therefore, no detail of the internal structure of the general purpose register control 10 is needed to understand this part of the data processor.

Figure 4:
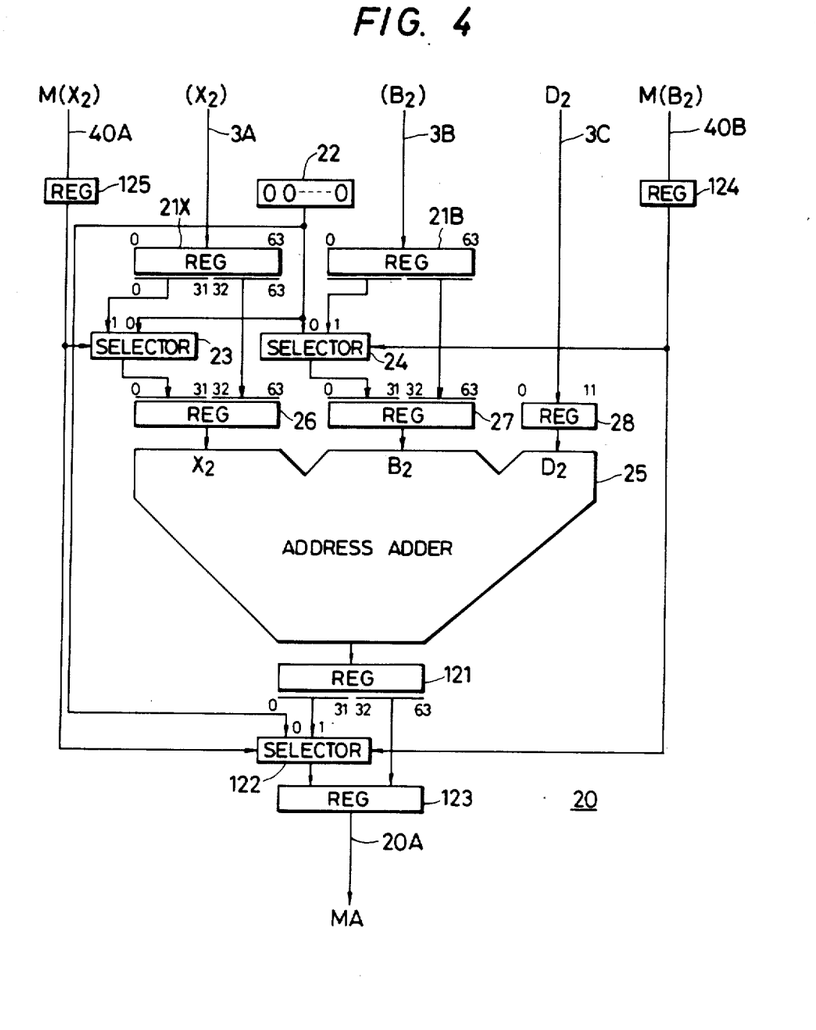
FIG. 4 is a schematic diagram of an address calculation circuit used in a data processor of FIG. 2.

Address calculation circuit (20).

As is shown in FIG. 4, two registers 21X and 21B receive the register contents $(X_2)$ and $(B_2)$ provided from the general register control 10 by way of the lines 10A and 10B. Furthermore, the two registers 125 and 124 receive mode bits $M(X_2)$ and $M(B_2)$, respectively, from the mode register control 40, by way of the line 40A and 40B. A register 22 holds 32 bits of bit value 0. The selector 23 selects the most significant 32 bits of the register content $(X_2)$ held by the register 21X or the constant data held by the register 22 depending upon whether the mode bit $M(X_2)$ provided by the register 125 is 1 or 0, to provide the selected 32 bits into the most significant 32 bit part of an input register 26. The remaining part of the register 26 receives the least significant 32 bits of the register content $(X_2)$ held by the register 21X. Thus, the significant bit length of the data stored in the input register 26 has either 64 bits or 32 bits, depending upon the mode bit $M(X_2)$.

Similarly, the selector 24 selects the most significant 32 bits of the register content $(B_2)$ held by the register 21B or the constant data held by the register 22, depending upon the mode bit $M(B_2)$ held by the register 124, to provide the selected 32 bits into the most significant 32 bit part of an input register 27. The least significant 32 bit part of the register 27 receives the least significant 32 bits of the register content $(B_2)$ held by the register 21B.

The displacement part $D_2$ is received by a register 28 to be added by the adder 25 to the data held by the registers 26 and 27. The sum is stored in a register 121. The selector 122 selects the most significant 32 bits of the sum held by the register 121 or the constant data held by the register 22, depending upon whether or not at least one of the mode bits $M(X_2)$ and $M(B_2)$ is 1. The selected data is stored in the most significant bit portion of the register 123, which further receives the least significant 32 bits of the register 121 at its own least significant 32 bit position.

Thus, the significant bit length of the address held by the register 123 is 32 bits, when the registers designated by fields $X_2$ and $B_2$ are used as conventional 32 bit registers, while the signifcant bit length is 64 bits, when at least one of the two registers designated by fields $X_2$ and $B_2$ is used as a 64 bit register.

The memory address thus generated is sent to the storage control unit 300 by way of the line 20A, to allow access to the main storage therewith. In case of the Load or Add instruction, data of 64 bits is fetched from the main storage 400 and sent to E unit 30 by way of a line 300A.

Figure 5:
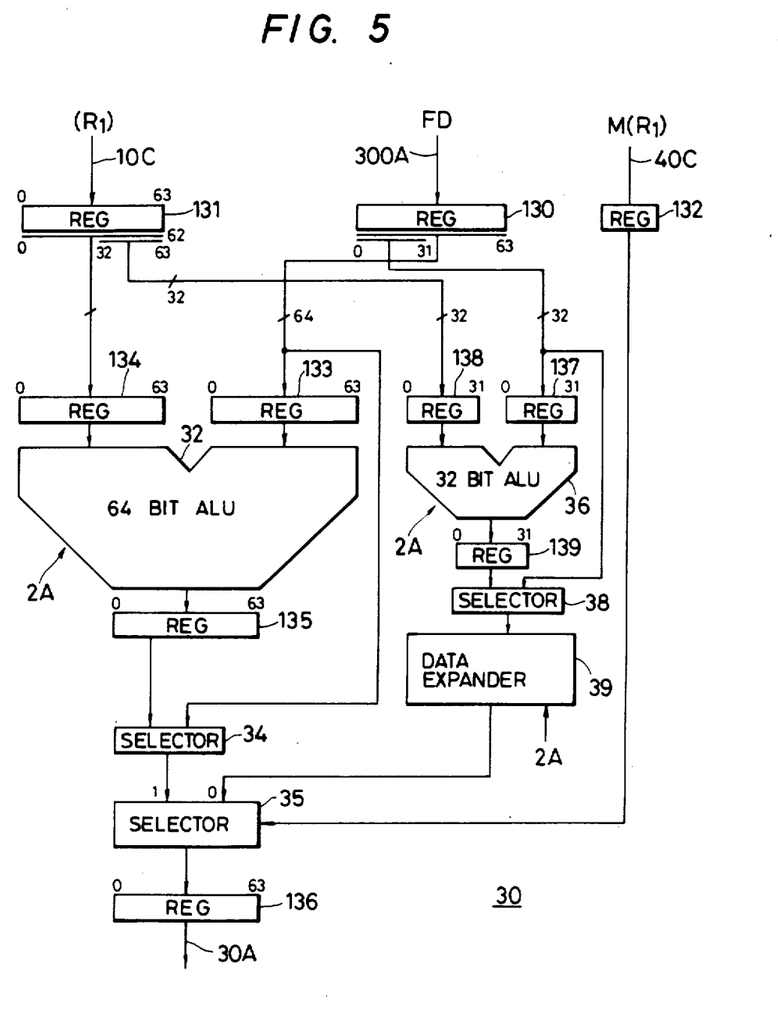
FIG. 5 is a schematic diagram of an execution unit used in the data processor of FIG. 2.

Execution unit 30 (E unit).

As shown in FIG. 5, the fetched data is received by a register 130 from SCU 300 via line 300A, while the register content $(R_1)$ read out of the register $R_1$ by the general purpose register control 10 is received by the register 131 and the mode bit $M(R_1)$ is received by and stored in the register 132.

In the case of a Load instruction, the 64 bit fetched data received by the register 130 is selected by a selector 34, and the most significant 32 bits of the fetched data is selected by a selector 38. The 32 bit data selected by the selector 38 is expanded by a data expander 39 to 64 bit data, so that 32 bits of bit value 0 or 32 bits of bit value 1 are added to the more significant side of the 32 bit data selected by the selector 38, depending upon whether the most significant bit n of the selected 32 bits is 0 or 1. A selector 35 selects an output of the selector 34 or an output of the data expander 39, depending upon whether the mode bit $M(R_1)$ held by the register 132 is 1 or 0. Thus, when the mode bit $M(R_1)$ is 1, the fetched data received via selector 34 is transferred to the general register control 10 by way of a register 136 and a line 30A. When the mode bit $M(R_1)$ is 0, however, the data transferred to the register $R_1$ is 64 bits of data having the most significant 32 bits of the feteched data received via selector 38 at its least significant 32 bit positions and having 32 bits, of bit value 0 or 32 bits of bit value 1 at its most signifiant 32 bit positions, as was schematically explained in connection with FIG. 3.

In the case of an Add instruction, the operation results by ALUs 32 and 36 are used. That is, the 64 bit fetched data is supplied to the ALU 32 from the register 130 by way of a register 133, the register content $(R_1)$ is supplied from register 131 to the 64 bit ALU 32 by way of a register 134. The ALU 32 is controlled in response to signals on a line 2A given by the decoder 2 (FIG. 2), so as to perform addition of these two data. The resulting sum is sent to the selector 34 by way of a register 135. The selector 34 selects the sum in case of an Add instruction.

Meanwhile, the most significant 32 bits of the fetched data held by the register 130 and the least significant 32 bits of the register content ($R_1$) held by the register 131 are supplied to the 32 bit ALU 36, respectively by way of registers 137 and 138. The ALU 36 is controlled in response to the signal on line 2A so as to perform addition on these two data. The resulting sum is sent to the selector 38 by way of a register 139, and is selected in case of an Add instruction. The data expander 39 performs the same operation on the output of the selector 38 as explained with reference to a Load instruction. Thus, the output of the data expander 39 represents the sum of two 32 bit data, and has a significant bit length of 32 bits.

As already mentioned, the selector 35 selects the outputs of the selector 34 or the data expander 39, depending upon whether the mode bit $M(R_1)$ is 1 or 0. Therefore, when the mode bit $M(R_1)$ is 1, the addition result having a significant bit length of 64 bits is obtained in the register 136, and when the mode bit $M(R)$ is 0, the addition result having a significant bit length of 32 bits is obtained in the register 136. The content of the register 136 is transferred tb the register $R_1$ to be written therein. Thus, an ADD instruction can be performed on different significant bit lengths of data.

Figure 6:
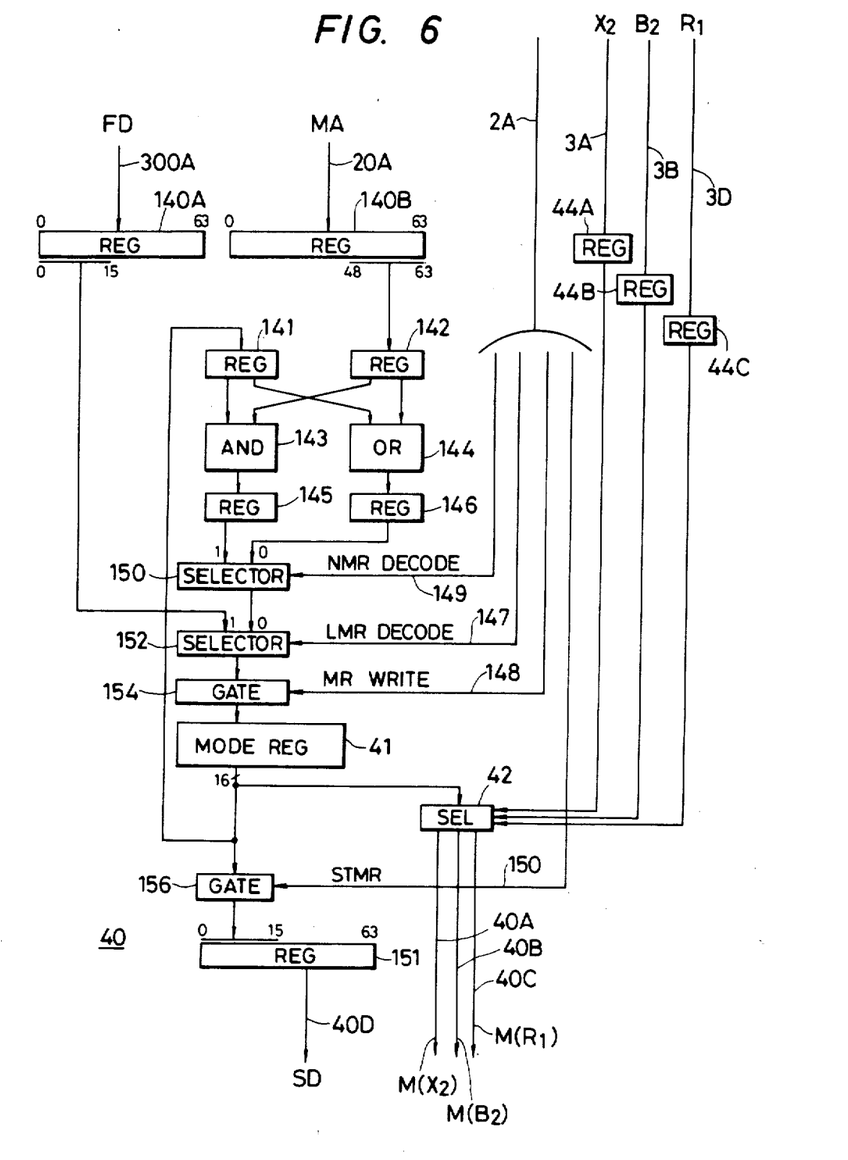
FIG. 6 is a schematic diagram of a mode register control used in the data processor of FIG. 2.

Mode Register Control 40.

As shown in FIG. 6, the instruction fields $X_2$, $B_2$ and $R_1$ provided by the instruction register control 100 by way of the lines 3A, 3B and 3D are received by registers 44A, 44B, and 44D and are transferred to a selector 42 which selects the mode bits $M(X_2)$, $M(B_2)$ and $M(R_2)$ from the 16 bit mode register 41 to send them onto lines 40A, 40B and 40C, in parallel. Thus, the mode bits $M(X_2)$ and $M(B_2)$ required by the address calculation circuit 20 and the mode bit $M(R_1)$ required by the E unit 30 are read out from the mode register 41, and are used as explained already. The initial values of the mode bits are all 0. Changing the mode bits in the mode register is performed by the following newly provided four instructions, which are all of S format. In this format, a memory address for an operand is determined by summing up the content of a register designated by field $B_2$ and the displacement $D_2$.

(1) OR mode Register (OMR) instruction.

In response to this instruction, a memory address MA for an operand is calculated by the address calculation circuit 20, according to the method already explained, and the memory address MA is received by a register 140B by way of a line 20A. The least significant 16 bits of the memory address MA held by the register 140B is sent to an OR circuit 144 by way of a register 142. The 16 bit contents of the mode register is also sent to the OR circuit 144 by way of a register 141. The OR'ed result is sent to a selector 150 by way of a register 146.

The selector 150 as well as a selector 152 and gates 154 and 156 are controlled by signals given by way of a line 2A from the decoder 2 of FIG. 2A. For example, the selector 150 selects a register 145 in response to a NMR DECODE signal on a line 141 which is given by the decoder 2, when an AND Mode register (NMR) instruction is decoded by the decoder 2. Similarly, the selector 152 selects a register 140A in response to an LMR DECODE signal an a line 147 which is given by the decoder 2 when the decoder 2 decodes a Load Mode register instruction, to be explained later on. The data 154 is opened in response to an MR write signal on a line 148 which is given by the decoder 2, when the decoder 2 decodes the IR mode register instruction, AND mode register instruction, and Load mode register instruction.

In case an OR mode register instruction is decoded by the decoder 2, the register 146 is selected by the selectors 150 and 152, and the gate 154 is enabled, so as to write the content of the register 146 into the mode register 41.

(2) AND Mode Register (MNR) Instruction.

The mode bits in the mode register 41 and the least significant 16 bits of the memory address held by the register 140B are sent to an AND circuit 143 by way of the registers 141 and 142, and the results are written into the mode register 41 by way of the register 145, selector 150 and 152 and a gate 154.

(3) Load Mode Register (LMR) Instruction.

In case of this instruction, data is read from the main storage 400 based upon the address fields of this instruction, quite in a similar way to that explained before in connection with a Load instruction. The fetched data is sent to the mode register control 40 by way of a line 300 to be received by a register 140A. The most significant 16 bits of the fetched data are written in the mode register 41 by way of the selector 152 and the gate 154.

(4) Store Mode Register (STMR) instruction.

When this instruction is decoded by the decoder 2 (FIG. 2), the mode bits in the mode register are transferred to a register in its most significant 16 bit positions, because the decoder 2 provides an STMR decode signal on a line 150 and the gate 156 is enabled in response to this signal. The content of the register 151 is transferred to the storage control unit 300 by way of a line 40D so as to be stored in the main storage at the storage location designated by the memory address generated by the memory address calculating circuit 20 in response to this instruction.

It is better to make these four instructions non-privileged. The contents of the general purpose registers change depending upon program and changes from time to time even when one program is performed. Therefore, it is desirable to make the four instructions usable even in a non-privileged program.

According to the above embodiment, the following features exist.

(1) Execution can be effected without changing the conventional program. Since the initial value of the mode bit register is 0, and since it can be used to indicate the significant bit length of the addresses used in the conventional programs, no change of the conventional programs becomes necessary.

(2) In order to operate the conventional programs when the data for the convention programs is stored in the extended address portion, the only modification to be made is that the mode bit corresponding to a general purpose register used as the address register for the data is made 1 before access is made to the data in the extended address portion, and at the point of time when the use of the address register is completed, the mode bit is made 0. In other words, the addition of two instructions is required.

(3) When the conventional program is stored in the extended address portion and is to be operated, only a similar modification as described above is necessary regarding the general purpose register to be used as giving the base address for the program portion.

(4) Extension of the data unit length for processing of fixed point data can be easily done from, e.g., 32 bits to 64 bits, by changing the mode bit associated with the general purpose register to be engaged in an operation from 0 to 1.

(5) When the content of the general purpose register used in the extension mode is stored in the memory or a value is set again from the memory, the size of the storage region must be changed from the conventional 4 bytes to 8 bytes, but the operation of such a change is easy.

(6) Even when preparing afresh a program operative in the extended address, conventional software techniques, such as use of a compiler, can be used.

The present invention can realize address extension with hardly any modification of the instruction system, so that the conventional programs and the conventional software techniques, such as use of a compiler can be also used easily. In other words, (1) the instruction system hardly changes, and (2) only when the general purpose register is used as the extended address, an instruction to modify the corresponding mode bit is added thereby realizing the address extension. Accordingly, enormous programs that have been developed in the past can be executed as such, and can also be executed at the extended address with slight modification. As a result, the number of steps in developing the sofware that becomes necessary with the address extension can be remarkably reduced.

The invention is not restricted to the embodiment disclosed herein but includes modifications available to those skilled in the art within the scope of the appended claims. For example, it is possible to provide two mode bits for each general purpose register. One of the two mode bits may represent whether or not data read out from or to be written in a corresponding general purpose register is to be treated as address data of an extended significant bit length. The other one of the two mode bits may represent whether or not data read out from or to be written in a corresponding general purpose register is to be treated as data from operation of an extended significant bit length.

Also, while the exemplary embodiment is described as operating in response to a single instruction for reading data from one or more general registers, operating on that data and writing the result into a general register, it should be understood that a first instruction may designate a general register to be read out and a second instruction may designate a register to be written in.

What is claimed is:

1. A data processor for performing data processing operations in response to program instructions, comprising:
   a plurality of general registers, each having a first predetermined bit length;
   mode signal storage means for holding a plurality of mode signals each indicating a significant bit length for data stored in a respective one of said general registers;
   mode reading means responsive to a program instruction for reading out of said mode signal storage means at least one mode signal corresponding to one of the general registers designated by the program instruction as one which should be accessed for read-out or write-in of data;
   register accessing means connected to said general registers and responsive to program instructions for accessing selected ones of said general registers to read-out or write-in data;
   data use means connected to said general registers for processing data from one of the general registers accessed by said register accessing means in response to a program instruction which requests a read-out of data from the general registers, including means responsive to a first mode signal read out by said mode reading means in response to the program instruction for changing the significant bit length of the data read out from a first general reegister adding bits thereto; and
   data supply means connected to said general registers for writing data in one of the general registers accessed by said register accessing means in response to a program instruction which requests write-in of data in said general registers, including means responsive to a second mode signal read out by said mode reading means in response to the program instruction for changing the significant bit length of the data to be written into the general register by adding bits thereto.

2. A data processor, according to claim 1, further including a main storage, and wherein said data use means includes address generating means for generating a main storage access address based upon the data read out from a general register and having a significant bit length which is dependent upon said first mode signal.

3. A data processor, according to claim 2, wherein said address generating means includes:
   first means for generating a plurality of bits of bit value "0" and having a second predetermined bit length, said second predetermined bit length being smaller than said first predetermined bit length;
   second means connected to said first means and said mode signal storage means for responding to said first mode signal by modifying the most significant part of the data read out of the register so that the most significant part is replaced by the bits of second predetermined bit value "0", when the first mode signal has a first value;
   third means for adding the data read out from the register and modified by said second means to a displacement part of the instruction;
   fourth means for responding to the first mode signal by modifying the most significant part of the data generated by the third means and representing the result of the addition so that the most significant part of the data generated by the third means is replaced by the bits of second predetermined bit length and bit value "0" when the first mode signal has said first value, to provide the result of the modification as said access address.

4. A data processor according to claim 3;
   wherein said mode reading means further reads a third mode signal corresponding to a third one of the general registers from said mode signal storage means in response to the instruction and said data use means further reads data from a third general register in response to the instruction;
   wherein said second means further includes means for responding to the third mode signal by replacing the most significant part of the data read out from the third general register by the bits of second predetermined length and bit value "0";
   wherein said third means includes means for adding the data read out from the first and third general registers and modified by the second means to the displacement part of the instruction; and
   wherein said fourth means includes means for responding to the first and third mode signals and modifying the most significant part of the data generated by the third means and forming the result of the addition so that the most significant part of the data generated by the third means is replaced by the second predetermined bit length of bits "0" when either one of the first and third mode signals has said first value, to provide the result of the modification as said access address.

5. A data processor according to claim 2, wherein said data supply means includes:
   first means for fetching data of the first predetermined bit length from said main storage based upon the generated access address;
   second means for receiving the fetched data and generating data comprising the most significant bits of the fetched data and a plurality of bits of second predetermined bit length and having a bit value "0" or a bit value "1" in response to a predetermined condition of the fetched data, placed at the more significant side of the most significant bits of the fetched data; and
   third means responsive to the second mode signal for selectively providing either the data generated by the second means or the fetched data to said second general register to be written therein.

6. A data processor according to claim 5, wherein the second means includes means for selectively generating the second predetermined bit number of bits of value "0" or bits of value "1", depending on the sign bit of the fetched data.

7. A data processor according to claim 2,
   wherein said data supply means includes:
   first means for fetching data of said first predetermined bit length from said main storage based upon the generated access address;
   second means for receiving the fetched data and performing a first arithmetic operation on a part of the first significant bit length of said fetched data to provide first data corresponding to the result of the operation and having the first significant bit length;
   third means for receiving the most significant bits of a third predetermined bit length of said fetched data and performing a second arithmetic operation on the most significant bits of the fetched data, to provide data comprising plural bits of the third bit length obtained as a result of the second arithmetic operation and plural bits of all "0" or "1" of the more significant bit side of the plural bits of the third bit length; and
   fourth means responding to the second mode signal for selectively providing either one of the first and second data to the second general register to be written therein.

8. A data processor according to claim 7,
   wherein said data use means further includes means responsive to a first program instruction for reading out the data from a second general register to provide the read out data to the second means as an operand therefor and the most significant part of the third bit length of the read out data to the third means as an operand therefor.

9. A data processor according to claim 2, further comprising:
   logical operation means for performing a logical operation on each pair of respective bit of part of the generated access address bits and a respective one of said plurality of mode signals stored in said mode signal storage means; and
   means for writing data obtained by said logical operation means into said mode signal storage means in response to a program instruction.

10. A data processor according to claim 9, wherein said logical operation means includes AND operation means.

11. A data processor according to claim 9, wherein said logical operation means includes OR operation means.

12. A data processor according to claim 2, further comprising means responsive to an instruction for storing the plurality of mode signals at a location designated by the generated address.

13. A data processor according to claim 2, further comprising means, responsive to the instruction, for loading into said mode signal storage means part of data stored at a location within the main storage designated at the generated address location.

* * * * *